H. M. Louden
C. W. McCreery
INVENTORS

BY Rule & Hoge
ATTORNEYS

Dec. 14, 1943.                H. M. LOUDEN ET AL                2,336,874
                METHOD OF AND APPARATUS FOR PRODUCING HOLLOW GLASS BLOCKS
                        Filed Dec. 27, 1941            4 Sheets-Sheet 4
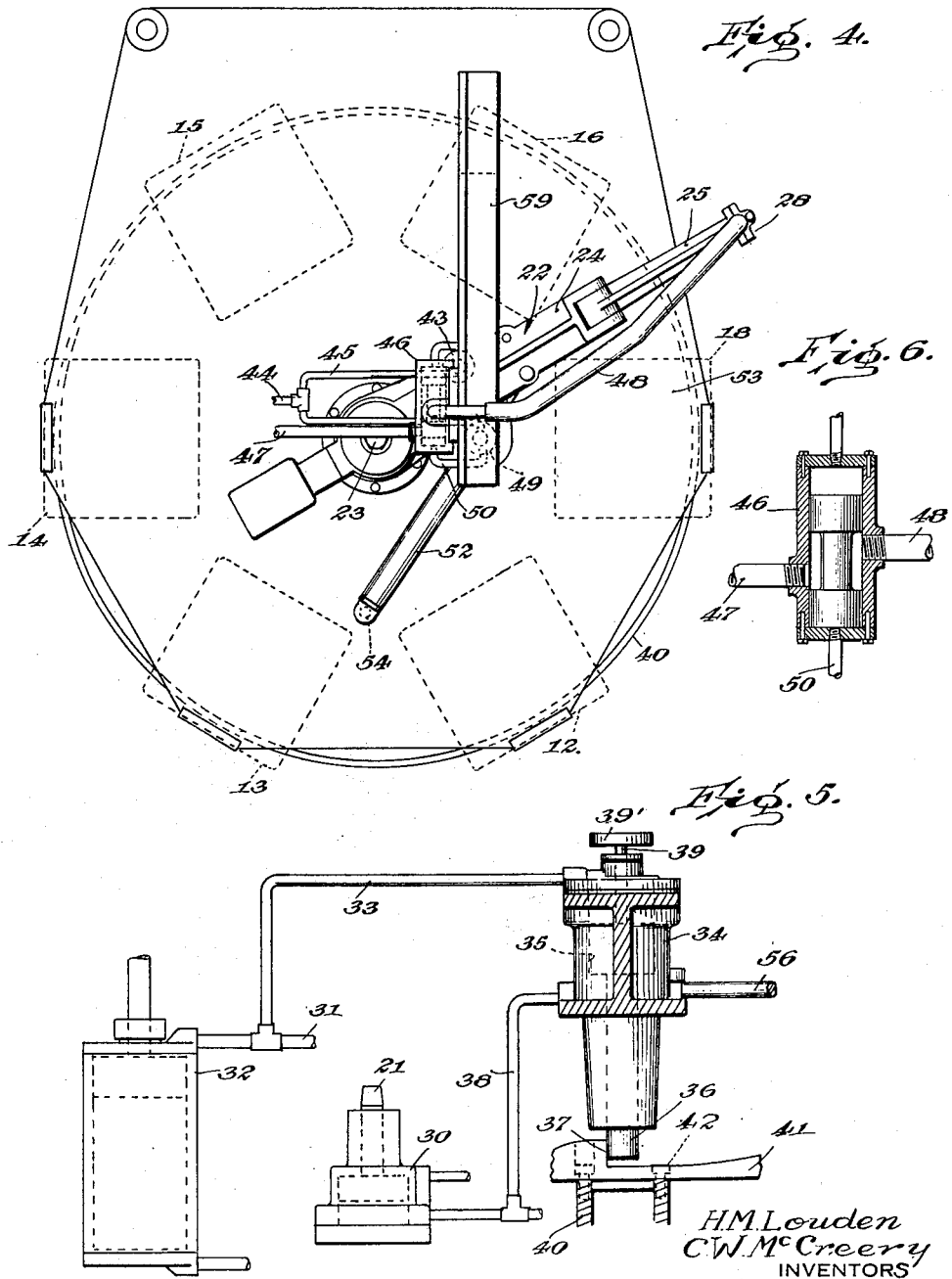

Patented Dec. 14, 1943

2,336,874

UNITED STATES PATENT OFFICE 2,336,874

METHOD OF AND APPARATUS FOR PRODUCING HOLLOW GLASS BLOCKS

Harry M. Louden and Cecil W. McCreery, Muncie, Ind., assignors to Owens-Illinois Glass Company, a corporation of Ohio Application December 27, 1941, Serial No. 424,662

6 Claims. (Cl. 49—1)

Our invention relates to improvements in methods of and apparatus for producing hollow glass blocks and is particularly concerned with the elimination, or material reduction, of internal condensation. To this end our invention specifically relates to a method of and apparatus for introducing dehydrated air or other such gases, into the halves or sections of hollow glass building blocks, or the like, to thereby remove moisture laden air therefrom before the halves are joined together and hermetically sealed into a permanent structure.

In the manufacture of present day commercial hollow glass blocks, the two halves of the block are formed separately and then placed in a position relative to each other so that the open ends of the halves may be heated and hermetically sealed together. The sealing of the halves in this manner entraps a certain amount of moist air in the sealed block, which is very undesirable because of the resultant condensation and cloudiness.

An object of our invention is to eliminate this internal moist condition by introducing dehydrated air or other gases into the open halves of the block just prior to the sealing thereof.

Another object of our invention is to control the mechanism for introducing the dehydrated air or gas in such a manner that the normal sealing operation of the block halves is uninterrupted.

Another object of our invention is to introduce dehydrated air into the halves of a hollow glass block just prior to the sealing thereof, thereby eliminating the moisture laden air in the halves of the block, and producing a hollow glass building block that is practically free from internal condensation.

Another object of our invention is to provide mechanism that may be easily adapted to a block sealing machine, to inject dehydrated air into the complemental half sections of a hollow glass building block during an index cycle of the sealing machine, completing the injection and removing an injector nozzle just prior to the permanent sealing of the half sections.

Other objects of the invention will become apparent hereinafter.

Referring to the accompanying drawings:

Fig. 4 is a top plan view of the apparatus with the pivoted arm shown in the opposite position from the full line position illustrated in Fig. 3.

Fig. 5 is a diagrammatic view showing how the piston actuated connector rod, or pin, is connected to the conventional air system of the block sealing machine.

Fig. 6 is a sectional view taken on the line 6—6 of Fig. 2.

Figure 1:
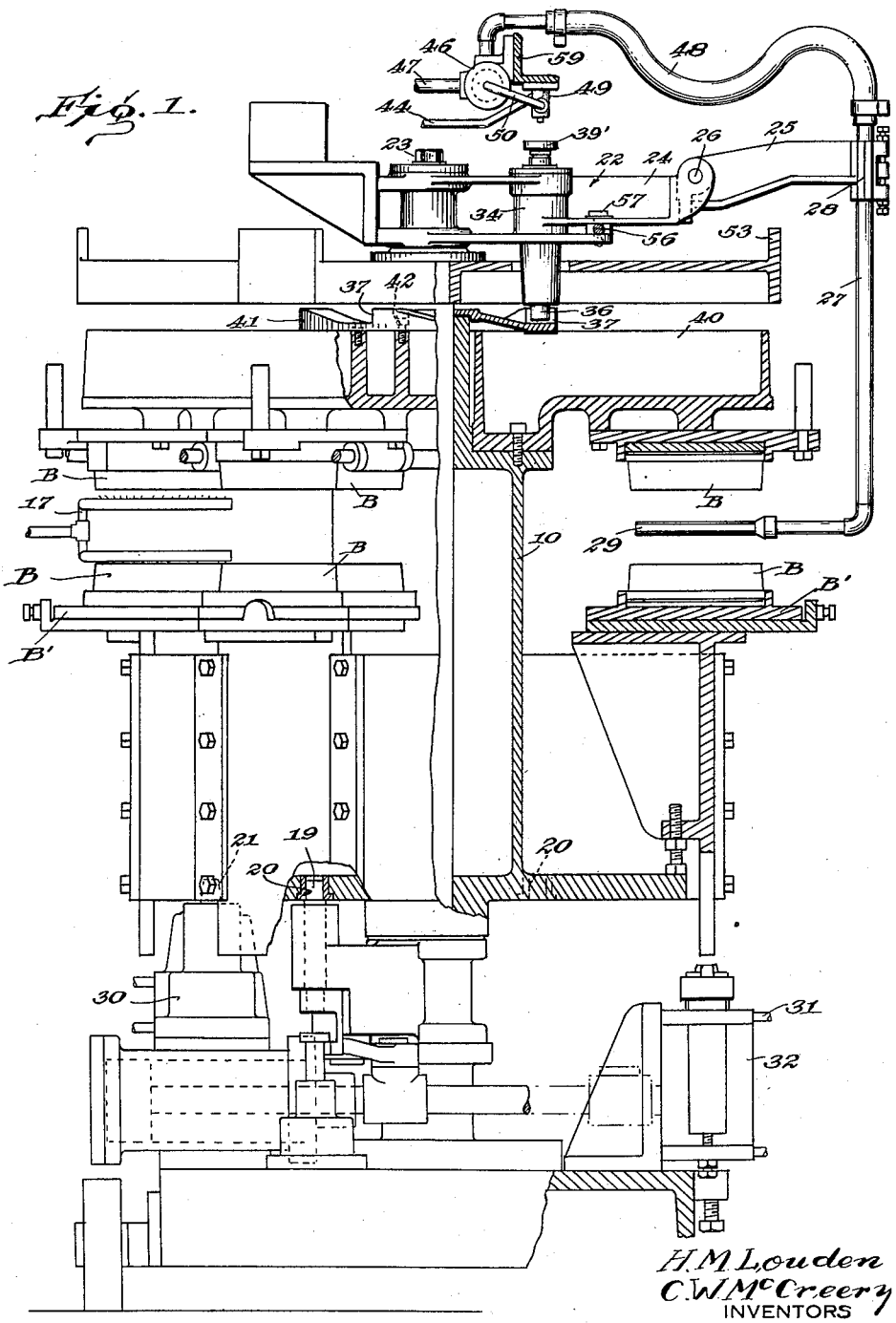
Fig. 1 is a side elevational view partly in section, showing the invention applied to a conventional block sealing machine.

For illustrative purposes we have shown our invention as applied to a conventional Lynch type block sealing machine.

In this machine the carriage 10 rotates intermittently about a vertical axis. There are six (6) index stations about the machine, viz., loading stations 12 and 13 (Fig. 4) where the upper and lower block halves B are placed in their respective holders, heating stations 14, 15 and 16, where the edges of the block halves are softened by heating units 17, preparatory to sealing, and the sealing station 18. This sealing station 18 is also where the completed block is removed after it has been hermetically sealed.

Our invention is most desirably and effectively used between the last heating station 16 and the sealing station 18 and at the latter station.

The indexing of the carriage 10 is conventional in that an index pin 19 (Fig. 1) periodically engages one of six holes 20 in said carriage 10 and rotates it 60°. At the completion of the 60° rotation, the pin 19 is retracted and a table lock 21 engages the carriage and holds the carriage from further rotation during the sealing of the block halves.

Mounted at the top of the machine is a horizontal arm 22 which can be oscillated upon a vertical bearing 23 at the center column, or axis of rotation, of the machine, to travel with the block holders during indexing thereof and support an injector nozzle 29 in position to introduce air into the block halves. The arm 22 is composed of two sections 24 and 25 disposed end to end and connected together by a horizontal pivot pin 26. This is to provide easy removal of the injector nozzle in changing from one job to another.

Figure 2:
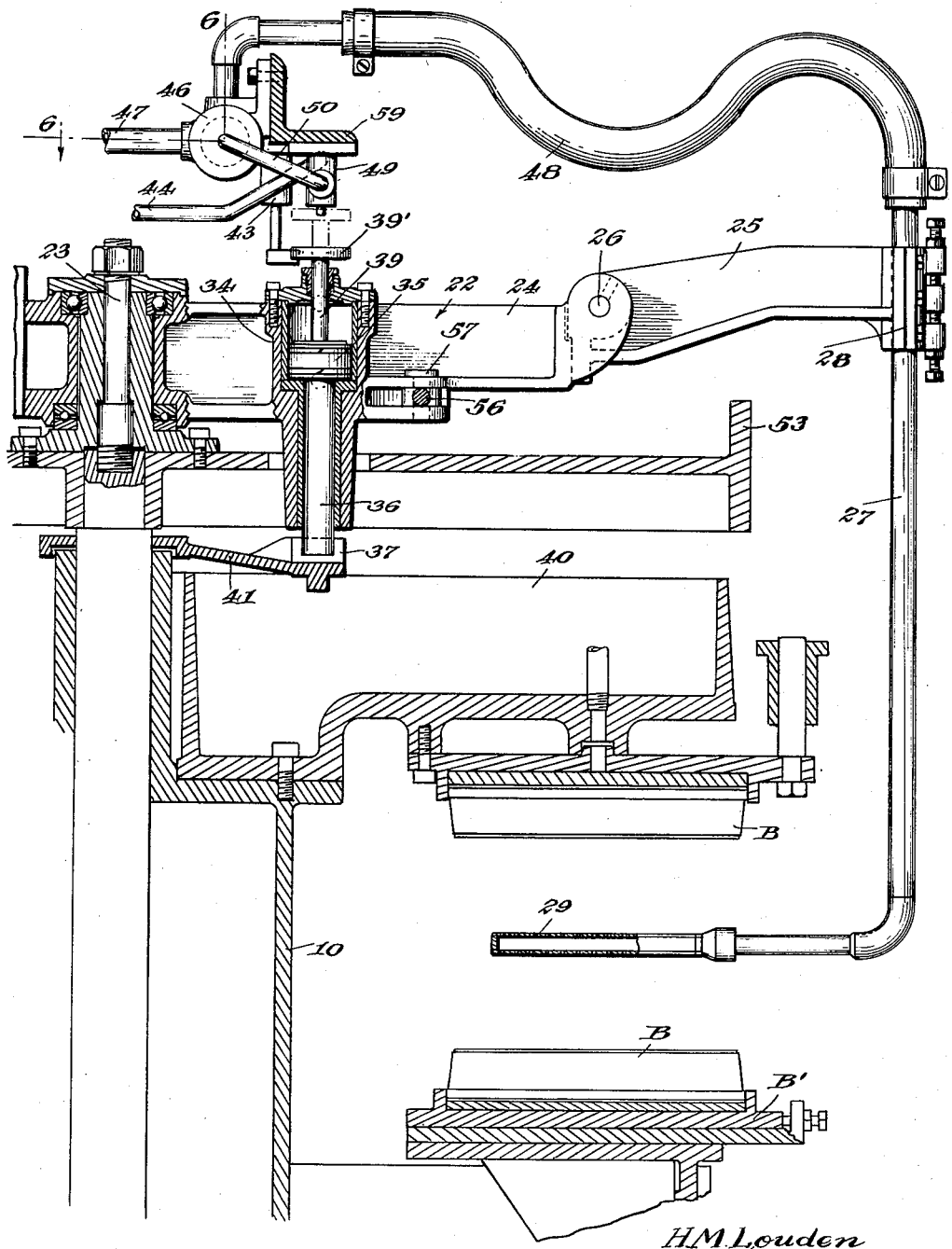
Fig. 2 is an enlarged vertical sectional view showing the relation of parts at the end of an indexing stroke of the machine.

The arm 22 (Figs. 1 and 2) carries at its outer end a depending hollow tube 27 through which dehydrated air is conducted to the nozzle 29, the latter discharging the air between the block halves B prior to the sealing thereof. The tube is supported for vertical adjustment by a clamp 28 at the outer end of the arm 22. Carried at the lower end of the tube 27 at right angles thereto and projecting radially inward of the machine is the injector nozzle 29 having upper and lower groups of perforations through which the dehydrated air is discharged.

Figure 3:
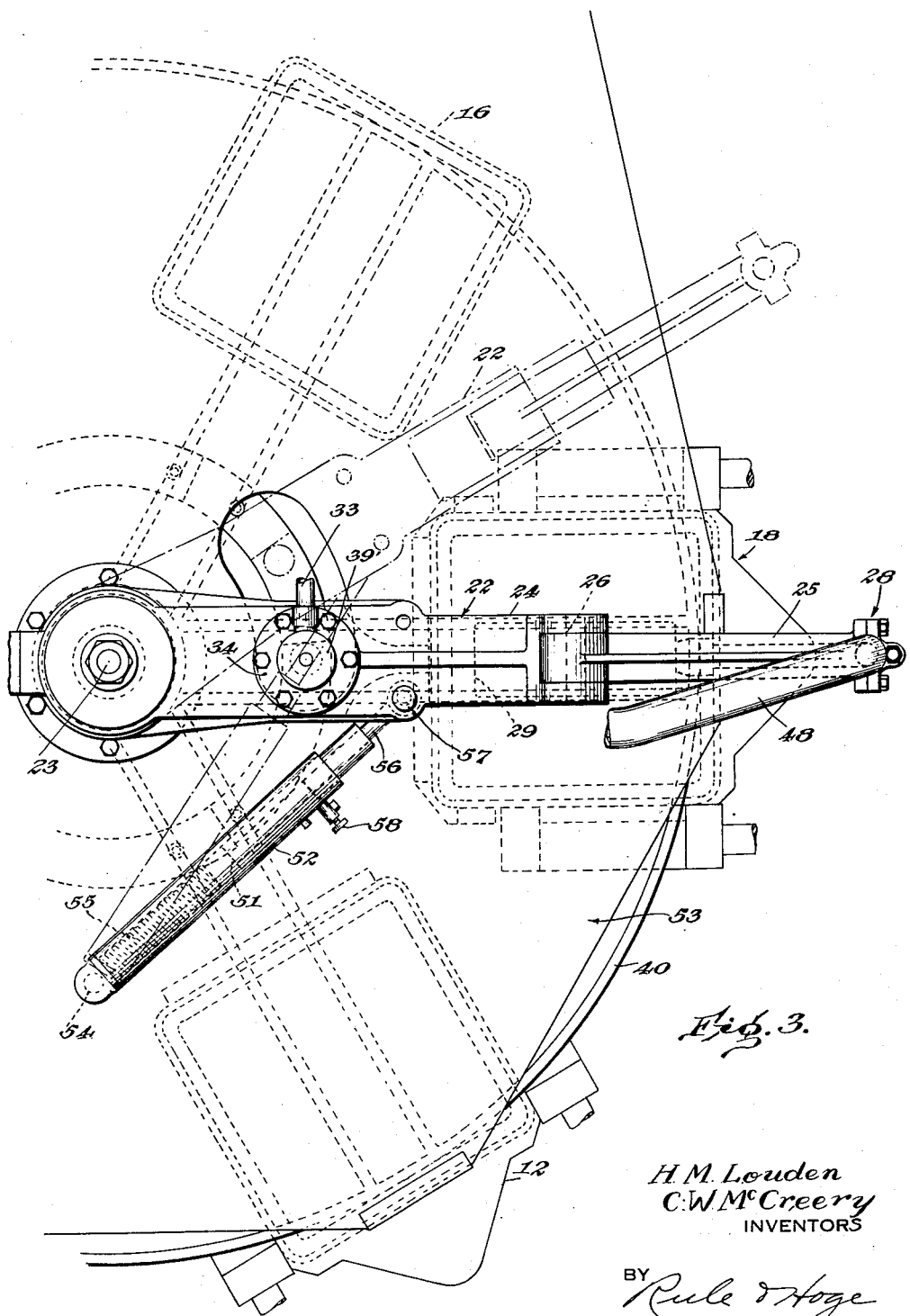
Fig. 3 is a fragmentary top plan view of the parts shown in Fig. 2.

The normal, or starting, position of the arm 22 is shown in full lines in Fig. 4 and dot and dash lines in Fig. 3. This position is midway between the last heating station 16 and the sealing station 18. To start a cycle of 60° index of the carriage 10, air is introduced into the top of a cylinder 30 (Fig. 5) retracting the table lock 21 from engagement with the carriage. Air is then applied from a supply line 31 (Fig. 5) to the top of a cylinder 32 (Figs. 1 and 5) lowering the lower block holder B' at station 18. If there is a completed block in the holder from the previous index, it is removed at this point. At the same time, air passes through a pipe 33 (Figs. 1, 3, and 5) to the top of a cylinder 34, attached to the arm 22, lowering a piston 35 and rod 36, which depends axially from the latter. The index pin 19 then engages one of the holes 20 in the carriage 10 and starts a 60° index of the carriage. One of an annular series of lugs 37 engages the extended rod 36 midway of the 60° index stroke to effect movement of the arm 22 and air nozzle 29 with the block halves B.

Dehydrated air is then injected through the nozzle 29 to the inside surfaces of the block halves B that have just left station 16, thereby dispersing the moisture laden air and removing all chances of condensation collecting within the block after it has been hermetically sealed. At the completion of the index stroke of the oscillating arm 22, air is applied to the lower end of the cylinder 30 (Fig. 5) which controls the table lock 21, thereby locking the carriage and preventing further rotation thereof. At the same time, air is applied through a connection 38 (Fig. 5) to the lower end of the cylinder 34, thus raising the piston 35. This raises the lower rod 36 or drive pin out of engagement with the lug 37. The arm 22 and the nozzle 29 are then returned to the normal or starting position shown in dot and dash lines in Fig. 3. Simultaneously with raising of the piston 35, air is admitted to the lower end of the block holder raising cylinder 32, thereby raising the lower block half B into contact with the upper half section of the block and hermetically sealing them together.

The cylinder 34 (Fig. 2) that is attached to the arm 22 houses the piston 35. Said piston carries the lower rod 36, or drive pin and an upper rod 39 both of which are in axial alignment with the piston. The lower rod 36 serves as part of the means for oscillating the arm 22 and the upper rod 39 acts as a valve operating member in controlling the flow of air to said nozzle.

Attached to the upper spider 40 (Figs. 1, 2, and 5) of the rotating carriage 10 and for rotation therewith, is a circular plate 41 secured thereto by bolts 42. The plate 41 carries the aforementioned six lugs 37 that periodically engage the drive rod 36, preparatory to advancing movement of the oscillating arm 22 in one direction. The arm 22 and the nozzle 29 remain in the normal or starting position, as shown in full lines in Fig. 4, during the time the block halves B are being hermetically sealed. At the end of the sealing dwell of the carriage, air is admitted from the supply line 31 (Fig. 5) to the top of the block holder raising and lowering cylinder 32, thus lowering the completed block. At the same time air from the supply line 31 is introduced through the pipe 33 to the upper end of the cylinder 34, thus lowering the piston 35. As the upper piston rod 39 (Figs. 1 and 2) travels downward its detachable head 39' engages the stem of a poppet valve 43. Opening of the valve 43 introduces air from a supply line 44 (Fig. 4) through a pipe 45, through valve 43 to one end of a spool valve 46. This moves the spool valve to such a position (Fig. 6) that dehydrated air may flow from its supply line 47 through spool valve 46 and thence through a flexible connection 48 to the injector nozzle 29. The dehydrated air continues to flow to the nozzle 29 until the piston 35 is moved upward.

When the piston 35 is raised, the head 39' on the upper piston rod 39 engages the stem of and thereby opens a poppet valve 49. This valve 49 controls air to the opposite end of the spool valve from that controlled by the poppet valve 43. Opening of the valve 49 allows air from supply line 44 to flow through the valve, through a pipe connection 50 to one end of the spool valve 46. This moves the spool in such a position to cut off the dehydrated air that was flowing from the supply line 47 to the nozzle 29. The dehydrated air remains off until the next index stroke of the carriage 10.

The return movement of the arm 22 to its starting position as shown in dot and dash lines in Fig. 3, is accomplished by a spring actuated piston 51 mounted within a cylinder 52. The cylinder 52 is secured to a top stationary member 53 of the machine, by a pivot pin 54. Mounted in one end of the cylinder 52, adjacent the pivot pin 54, is a coil spring 55 that bears against the inner end wall of the cylinder and the inner head of the piston 51. The piston has a piston rod 56 that is secured to the oscillating arm 22 by a pivot pin 57.

As may be readily seen, on the index stroke of the arm 22, the piston 51 does not perform any operative function except that it compresses the spring 55 within the cylinder 52. However, when the carriage 10 is released by the table lock 21 and the rod 36, the compressed spring 55 will force the piston 51 and piston rod 56 outwardly, thus returning the oscillating arm 22 to its starting position.

Positioned at the opposite end of the cylinder 52 from the spring 55 and behind the piston 51 is a throttle valve 58. The purpose of this valve is to retard and cushion the return stroke of the arm 22. The rapidity with which the arm is returned to its normal or starting position may be determined by adjustment of the throttle valve. As soon as the nozzle 29 has cleared the block halves B on the return stroke of the arm 22, the raising and lowering cylinder 32 is operated to raise the lower block half B into position for the halves of the block to be hermetically sealed. The valves 43, 46, and 49 are mounted on a stationary angle iron support 59 above the oscillating arm 22.

Modifications may be resorted to within the spirit and scope of the appended claims.

We claim:
1. In the method of producing a hollow glass building block wherein sections of said block are placed in juxtaposition and in register with each other and thereafter brought together and hermetically sealed, the step which consists in in- jecting dehydrated air between and into both sections simultaneously prior to and during the time they are being brought together.

2. In apparatus for making a hollow glass building block from preformed sections, means for supporting the sections of said block in juxtaposition and in register with each other including an annular series of holders, means to inject dehydrated air between and into both of the sections including a nozzle, automatic mechanical means for inserting the nozzle between said block sections, and means for sealing the sections together and entrapping the dehydrated air in the sealed block.

3. In apparatus for making a hollow glass building block from preformed sections, means for supporting the sections of said block in juxtaposition and in register with each other including an annular series of holders, means to inject dehydrated air between and into both of the sections including a nozzle, automatic mechanical means for inserting the nozzle between said block sections, and means for sealing the sections together and entrapping the dehydrated air in the sealed block, said means for inserting the nozzle between the block sections including mechanism for oscillating the nozzle through a predetermined angle in a horizontal plane about the axis of rotation of said series of holders and in register with successive holders.

4. In apparatus for making a hollow glass building block from preformed sections, a rotary carriage, means for rotating it intermittently about a vertical axis, means on said carriage for supporting block sections in juxtaposition and in register with each other, an arm pivoted for horizontal swinging movement about the vertical axis of said carriage, a nozzle carried by said arm for introducing dehydrated air into the sections, said nozzle capable of being positioned between said block sections, fluid actuated means carried by said arm comprising an air motor including a vertical piston and opposed rods mounted axially of the piston, a valve for controlling the flow of dehydrated air to said nozzle, means whereby one of said rods actuates the valve, means adapted to engage the other rod at times and thereby interconnect said pivoted arm and carriage and cause the arm to move with said carriage a predetermined distance, and means for sealing the block sections together after injection of the dehydrated air.

5. In apparatus for making a hollow glass building block from preformed sections, a rotary carriage, means for rotating it intermittently about a vertical axis, means on said carriage for supporting block sections in juxtaposition and in register with each other, an arm pivoted for horizontal swinging movement about the vertical axis of said carriage, a nozzle carried by said arm for introducing dehydrated air into the sections, said nozzle capable of being positioned between said block sections, fluid actuated means carried by said arm comprising an air motor including a vertical piston and opposed rods mounted axially of the piston, a valve for controlling the flow of dehydrated air to said nozzle, means whereby one of said rods actuates the valve, means adapted to engage the other rod at times and thereby interconnect said pivoted arm and carriage and cause the arm to move with said carriage a predetermined distance, means for reversing the direction of movement of said arm at intervals to thereby return the nozzle to its initial position, and means for hermetically sealing the block sections together after the removal of said nozzle.

6. In apparatus for making a hollow glass building block from preformed sections, a rotary carriage mounted for intermittent rotation about a vertical axis, means on said carriage for supporting the block sections in juxtaposition and in register with each other, stationary heating means mounted at circumferentially spaced points about the periphery of said carriage and positioned between the block sections, means to inject dehydrated air between and into the block sections after heating of the latter including a nozzle and means for inserting said nozzle into the space between said block sections, means for removing said nozzle, and means for hermetically sealing the sections together and entrapping the dehydrated air in the sealed block.

HARRY M. LOUDEN.
CECIL W. McCREERY.